Nov. 8, 1960    M. K. KRAVATS    2,958,927
METHOD OF MAKING ANTIFRICTION BEARING
Filed Oct. 29, 1958    2 Sheets-Sheet 1
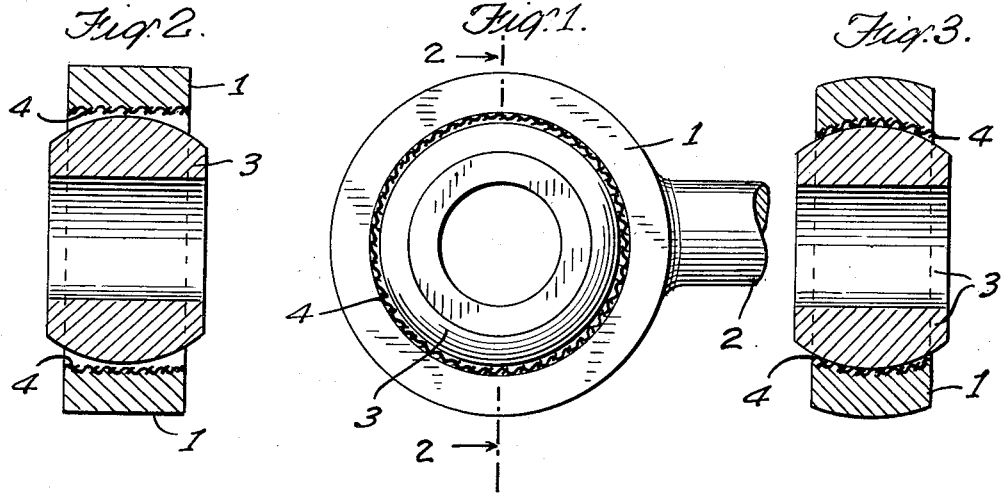
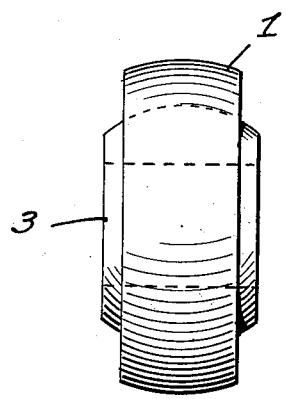
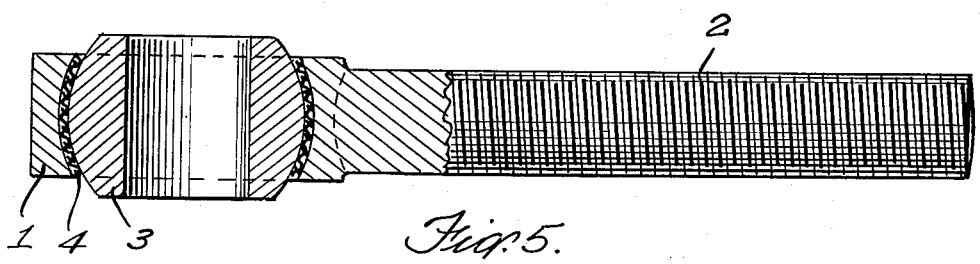
INVENTOR
MONROE K. KRAVATS
BY
ATTORNEY Nov. 8, 1960   M. K. KRAVATS   2,958,927
METHOD OF MAKING ANTIFRICTION BEARING
Filed Oct. 29, 1958   2 Sheets-Sheet 2

INVENTOR
MONROE K. KRAVATS
BY
ATTORNEY

United States Patent Office 2,958,927
Patented Nov. 8, 1960

2,958,927
METHOD OF MAKING ANTIFRICTION BEARING

Monroe K. Kravats, Danbury, Conn., assignor to Radial Bearing Corporation, Danbury, Conn., a corporation of Connecticut Filed Oct. 29, 1958, Ser. No. 770,378

1 Claim. (Cl. 29—149.5)

This invention relates to bearings for universal joints of the ball and socket type and the like and has for an object to provide an anti-friction bearing of the above type having novel and improved characteristics.

Another object is to provide a novel and improved method of making a bearing of the above type having an anti-friction liner constituting one of its contacting surfaces.

Other objects and advantages will be apparent as the nature of the invention is more fully disclosed.

In accordance with the invention a fabric composed of Teflon (tetrafluoroethylene) yarn is secured to the inner surface of the socket member in a position to contact the surface of the ball. This fabric may be molded in a layer of bonding resin to form a composite unit which is bonded to the socket member or may be bonded directly to the inner surface of the socket member which is formed around the ball and may constitute for example a rod end or the like as will be more fully described.

In any case the fabric forms or lies in a spherical bearing surface in contact with the outer spherical surface of the ball.

The nature of the invention will be better understood from the following detailed description taken in connection with the accompanying drawings in which certain specific embodiments have been set forth for purposes of illustration.

In the drawings:

Fig. 1 is a side elevation of the parts of a rod end showing the ball and socket bearing prior to the step of conforming the outer ring;

Fig. 2 is a transverse section taken on the line 2—2 of Fig. 1;

Fig. 3 is a section similar to Fig. 2 showing the outer ring after the forming operation;

Fig. 4 is an end elevation showing the finished bearing;

Fig. 5 is a side elevation of a rod end with parts in section;

Figure 6:
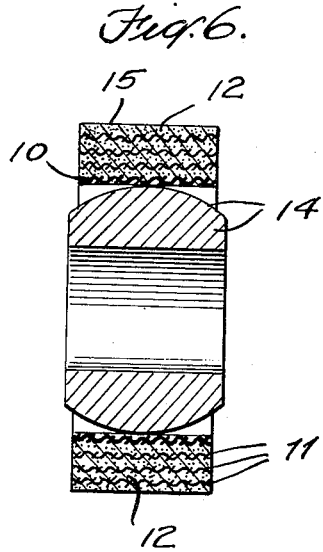
Fig. 6 is a sectional view of a resin impregnated bearing prior to molding.

Referring to the drawings more in detail, Figs. 1 to 5 show an embodiment wherein a metal ring 1 forming a part of a rod end 2, forms the outer bearing element and a metal sphere or ball 3 constitutes the inner element. The ring 1 is lined on its inner surface with a fabric layer 4 composed, at least on its inner surface, of Teflon yarn. The fabric layer 4 is adhered to the metal ring 1 by a suitable bonding-resin. For ease of bonding the fabric may be of the compound weave types as disclosed in the Rasero Patent No. 2,862,283 which discloses a weave wherein the Teflon yarns are exposed on one surface and are woven with cotton or other resin-bondable yarns which are exposed on the other surface. If this fabric is used the cotton backing is adhered or bonded to the inner surface of the metal ring 1 for firmly securing the fabric in place with the Teflon yarn exposed to form the bearing surface.

The bearing parts are assembled as shown in Figs. 1 and 2 with the inner surface of the ring 1 in cylindrical form. The ring 1 is then pressed in a suitable mold to conform its inner surface to the spherical shape of the ball 3 as shown in Fig. 3. This forming operation conforms the fabric layer 4 to the spherical shape of the ball 3 and locks the ball against axial displacement.

A ring member 1 has been described as a part of a rod end 2. It is to be understood, however, that the metal ring may constitute a separate member which is aligned and conformed to the ball surface as above described and is then inserted in the ring of a rod end.

Figure 7:
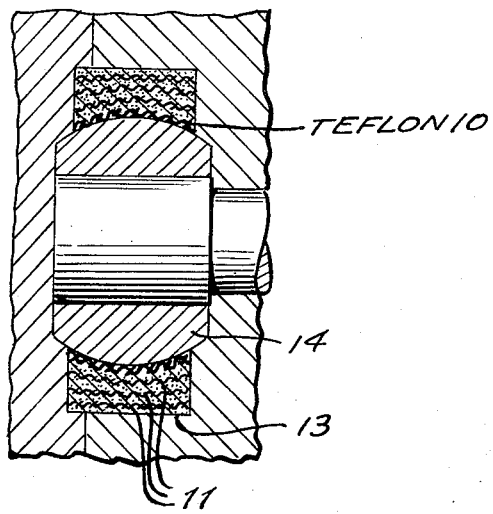
Fig. 7 is a sectional view of the bearing of Fig. 6 illustrating the molding step.
Figure 8:
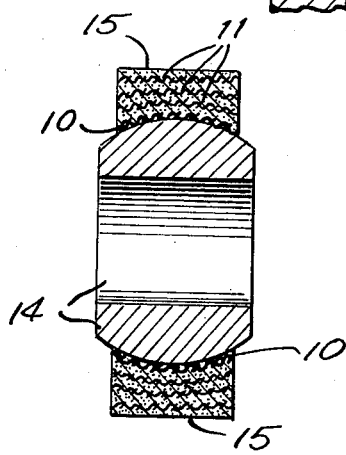
Fig. 8 is a sectional view of the finished bearing produced by the molding step of Fig. 7.
Figure 9:
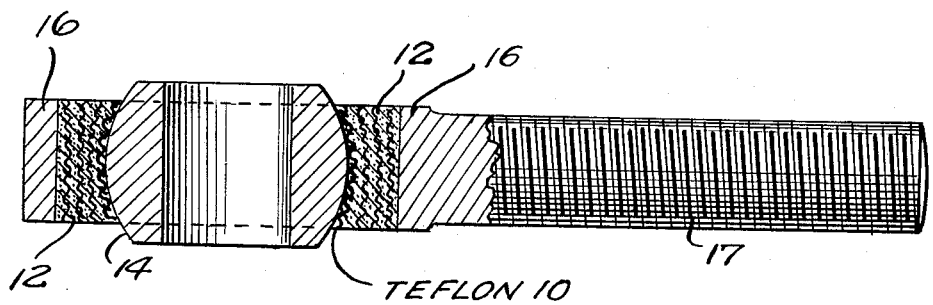
Fig. 9 is an elevation, partly in section, of the bearing of Fig. 8 as inserted in a standard rod end.

In the embodiment of Figs. 6 to 9 the outer ring member comprises a phenolic resin in which a plurality of layers or plies of fabric are embedded.

In this form an outer ply of fabric 10 composed at least on its outer surface, of Teflon yarn and a plurality of backing plies 11 of a fabric composed of glass fiber yarn are embedded in phenolic resin ring 12 which is placed in a mold cavity 13 and formed by heat and pressure around the surface of a ball 14 which forms the inner mold member. While subjected to heat and pressure the resin is cured to a hard rigid state.

In the product the Teflon fabric 10 forms the inner contacting bearing surface as in Figs. 1 to 5 and due to its concavity retains the ball permanently in position in a unitary bearing structure. The resin ring 12 is formed with a cylindrical outer surface 15 which may be secured in the ring 16 of a rod end 17. The final curing of the resin impregnated fabric ring 12 may take place after the ring 12 has been inserted in the ring 16 of the rod end 17 so as to bond the resin to the metal ring 16.

Additional adhesives may be used for this purpose if necessary, or the metal ring 16 may be staked over the ends of the ring 12.

In this embodiment the glass fabric plies back up and reinforce the Teflon ply and build the fabric up to the desired thickness. The resin serves to impregnate the various plies and to bond the same into a unitary structure.

By molding the outer element directly around the inner spherical surface of the ball, the bearing surface is caused to conform precisely to the surface of the ball and it is unnecessary to machine the surface of the ball to the preciseness which would otherwise ordinarily be required.

Although certain specific embodiments have been shown for purposes of illustration it is to be understood that the invention can be applied to various uses and that adaptations may be made therein as will be apparent to a person skilled in the art.

What is claimed is:

In a method of making a universal bearing of the ball and socket type in which an inner metal ball having an outer spherical surface is seated within a unitary outer metallic ring member, the improvement which comprises providing on the inner surface of a metallic ring member of cylindrical form a layer of fabric of bondable yarns and Teflon yarns woven together with said bondable yarns on one surface of said fabric and in contact with the inner surface of said ring and the Teflon yarns exposed on the other surface of said fabric, bonding the bondable yarns of said fabric to said inner surface of said ring member, whereby the fabric layer is maintained in position in said ring member, assembling a metal ball within said ring member and then applying external pressure on the outer surface of said ring member to convert the inner and outer surfaces of said ring member and said layer of fabric bonded thereto to a spherical form conforming substantially to the outer spherical surface of said ball, whereby the ball is locked in position within said ring member against axial displacement, with the exposed Teflon yarn in surface contact with said ball and forming a bearing surface therefor.

References Cited in the file of this patent

UNITED STATES PATENTS

| Re. 18,843 | Skillman | May 30, 1933 |
| 2,804,886 | White | Sept. 3, 1957 |
| 2,838,436 | Clingman | June 10, 1958 |